United States Patent Office 3,609,991
Patented Oct. 5, 1971

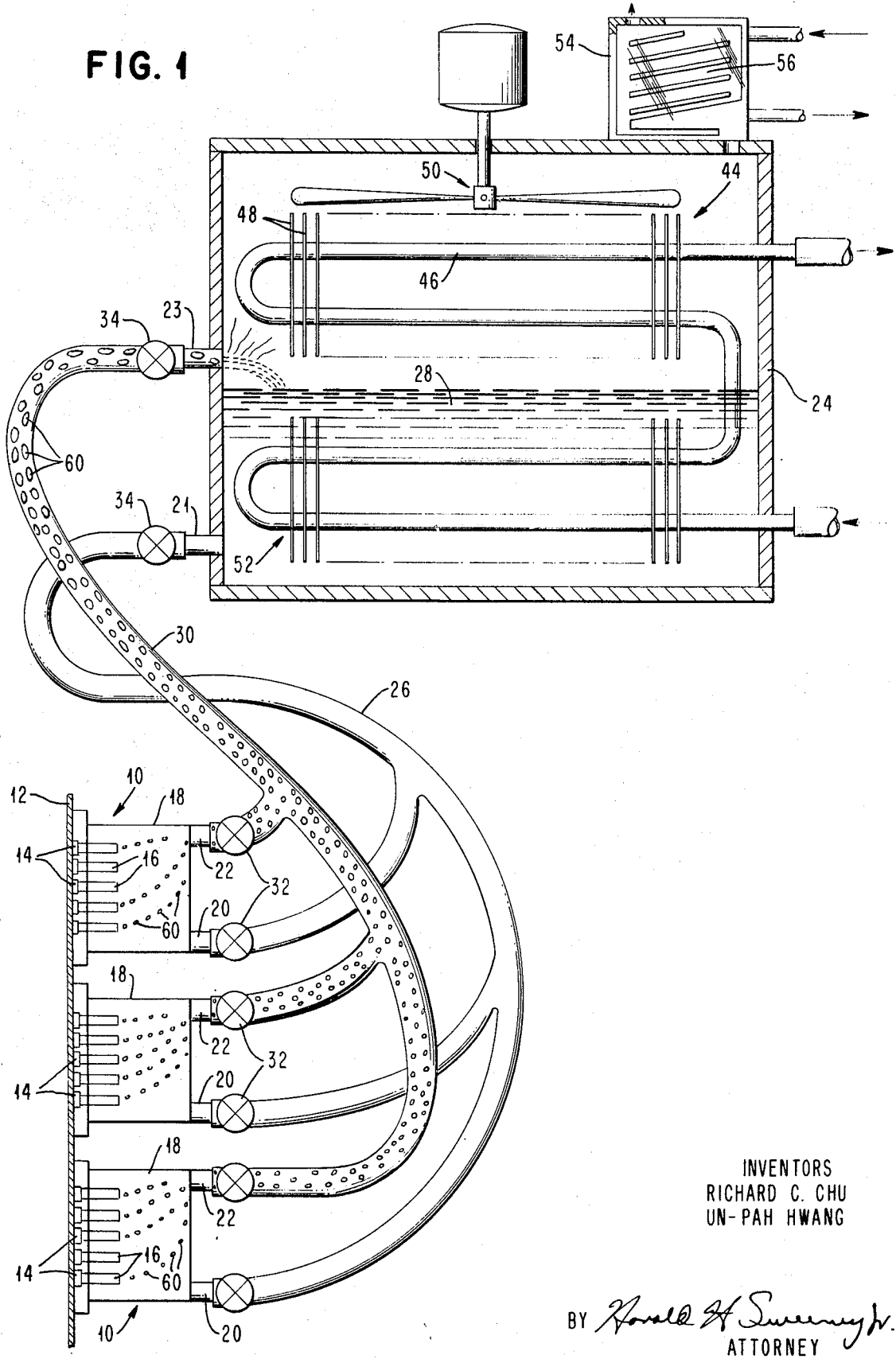

3,609,991
COOLING SYSTEM HAVING THERMALLY
INDUCED CIRCULATION
Richard C. Chu and Un-Pah Hwang, Poughkeepsie, N.Y., assignors to International Business Machines Corporation
Filed Oct. 13, 1969, Ser. No. 865,710
Int. Cl. F25d 17/00
U.S. Cl. 62—333     7 Claims

ABSTRACT OF THE DISCLOSURE

A plurality of modular packaged heat generating electronic components are cooled so as to remain within predetermined operating temperature limits. Each of the modular units contains a chamber having a bottom inlet and a top outlet. The outlet at the top of each module is connected to an inlet of a reservoir of cooling liquid above the liquid level and below a condensing unit. The inlet of each modular unit is connected to the reservoir below the liquid level. A subcooler is provided within the liquid in the reservoir for maintaining the coolant liquid below a desired temperature. As heat is generated at the components, nucleate boiling takes place wherein the vapor bubbles rise and set up a two-phase flow within the connection between the top of the module and the reservoir. The vapor, upon entering the reservoir, rises and condenses on the condenser while the fluid falls into the liquid within the container. This two-phase flow sets up a pumping action which induces the natural circulation within the system. The system is self-regulating in that as the heat generation increases, the nucleate boiling increases, thus increasing the pumping action to thereby increase the cooling.

---

Figure 2A:
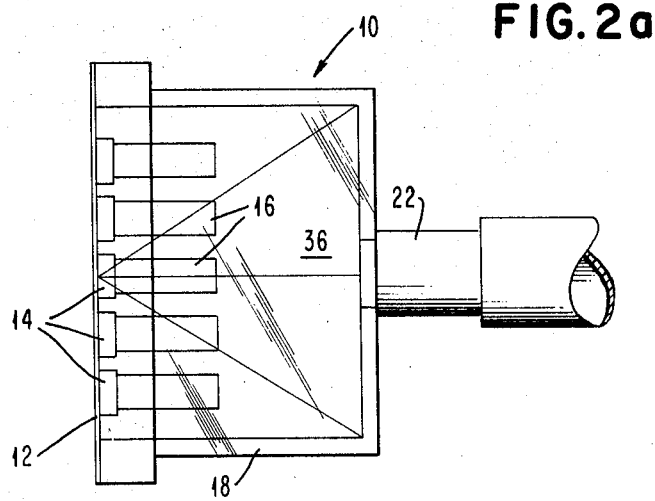

This invention relates to a cooling system for modular packaged electronic components and more particularly to a liquid cooling system wherein the cooling is provided by a boiling mode with thermally induced two-phase flow circulation.

As further techniques for miniaturizing electronic components have been developed, one of the size limiting factors has been the cooling. As the components have been reduced in size, the area from which the heat can be dissipated has likewise been reduced. Accordingly, new techniques for cooling these miniaturized components have become necessary. Recently, immersion type cooling systems have been investigated wherein the array of components to be cooled is immersed in a tank of cooling liquid. The liquids used are the new fluorocarbon liquids which have a low boiling point. These liquids are dielectric and give rise to various modes of cooling at relatively low temperatures. The mode of cooling and consequently the heat transfer is dependent on the heat flux at the surface interface between the component to be cooled and the cooling liquid. For a heat flux which produces a temperature below the boiling point of the liquid, natural convection takes place. As the heat flux increases the temperature beyond the boiling point of the liquid, nucleate boiling takes place. The nucleate boiling causes the vaporization of the fluid immediately adjacent the hot component. As the vapor bubbles form and grow on the heated surface, they cause intense micro-convection currents. Thus, nucleate boiling gives rise to an increase in convection cooling within the liquid and, accordingly, improves the heat transfer between the hot surface and the liquid. As the temperature or heat flux increases, the nucleate boiling increases to the point where the bubbles begin to coalesce and heat transfer by vaporization predominates. The modes of heat transfer via boiling have proven to be very efficient. However, there are problems in servicing and packaging components which are cooled using these techniques.

In co-pending U.S. patent application Ser. No. 744,862, filed July 15, 1968, now Pat. No. 3,512,582, an improved immersion cooling system is disclosed in which the electronic components to be cooled are packaged in modules. The electronic components are mounted on a circuit board. The components are surrounded by a chamber which is connected to a service vessel or container which is filled with the cooling fluid and serves as a fluid source, liquid degassing tank and makeup tank for all the modules connected thereto. Each module chamber contains a heat exchanger or condenser for condensing nucleate bubbles generated at the electronic components. Each heat exchanger has a separate cooling fluid circulation therethrough to maintain the heat exchanger at a sufficiently low temperature to provide the necessary condensing.

As the modules have been reduced further in size to the present plug-in multi-chip type of module, it has been necessary to provide a more efficient means of cooling since the number as well as the small size of the heat exchanger has limited the amount of heat that can be dissipated from the modular package. Thus, the heat exchanger has a separate cooling fluid circulating therethrough and configuration of the module.

Another disadvantage of the prior art modularly packaged cooling system has been the tendency to collect contaminants in the chamber which tends to interfere with the heat exchange at individual heat exchangers.

Accordingly, it is the main object of the present invention to provide an improved cooling system for modular packaged electronic components.

It is another object of the present invention to provide an improved cooling system which is not limited in shape, size or power of the module.

It is a further object of the present invention to provide an improved cooling system wherein the cooling provided is self-regulatory in accordance with the heat generated.

It is a further object of the present invention to provide an improved cooling system wherein fluid circulation is induced by two-phase flow.

Briefly, the cooling is provided by a boiling technique which induces circulation in the system by causing two-phase flow in the connection between the modular units and a reservoir of liquid. Each of the modular units contains a chamber having a bottom inlet and a top outlet. A liquid reservoir is located above the modular units and is connected via conduit from the bottom portion of the reservoir to the inlet of each of said units and from the top portion of each of the units to the top of the reservoir. A low temperature boiling-point liquid fills the reservoir and the chambers in each modular unit through the conduit connections therebetween. A condenser is located in the reservoir above the liquid and a cooling means is also located in the reservoir for sub-cooling the liquid. Nucleate boiling takes place in the liquid at the hot surfaces of the components. The nucleate boiling bubbles rise in said chamber and pass out the top outlet into the connection between the modular unit and the reservoir where a two-phase flow or pumping action takes place. The bubbles enter the above located reservoir and rise to contact the cooler condenser while the liquid, as it enters the reservoir, falls into the liquid contained therein. The condensate from the condenser drips into the liquid in the reservoir where it is further cooled by the cooling means. The nucleate boiling induced pumping action increases with an increase in the heat generated by the electronic components.

The foregoing and other objects, features and advantages of the invention will be apparent from the following more particular description of a preferred embodiment of the invention, as illustrated in the accompanying drawings.

FIG. 1 is a schematic diagram of the modular subcooled boiling-type cooling system.

FIGS. 2a, b and c are the plan, side and front views, respectively, of the module showing the specially sloped upper surface leading to the outlet.

Referring to FIG. 1, there are shown a number of multi-chip modules, units or packages 10 which may be adapted for plugging into a circuit board 12 or the like. The modules 10 are dimensioned in accordance with the desired level of serviceability. Reducing the module size to a very small level introduces problems such as multiplication of the number of connections to be made, etc. In other words, there is a practical limitation to be considered. It should be taken into consideration that during servicing, the rest of the system can still be in operation except for the module 10 under service. The electronic chips 14 usually have studs 16 connected thereto which extend into a chamber 18 which forms part of each module 10. The chamber 18 has a bottom inlet 20 and a top outlet 22 so that fluid can be circulated therethrough. The bottom inlet 20 of each module is connected to a bottom outlet 21 of a cooling fluid reservoir 24 by a connecting hose 26. Likewise, the top outlet 22 of each of the modules 10 is connected to an inlet 23 of the same coolant fluid reservoir 24 above the level of the coolant fluid 28 by a similar connecting hose 30. A valve 32 is provided in each connecting hose so that the modules 10 can be easily isolated for servicing without interrupting the coolant flow to other modules in the system. Also, additional valves 34 are supplied in the connecting hoses 26, 30 adjacent the fluid coolant reservoir 24 so that the flow in and out of the reservoir from the modules can be stopped. The connecting hoses 26, 30 are flexible so that they can be manipulated to facilitate the servicing of the modlues 10. The hoses can be of the plastic variety and the valves can be of the pinch type which can be added when needed.

Figure 2B:
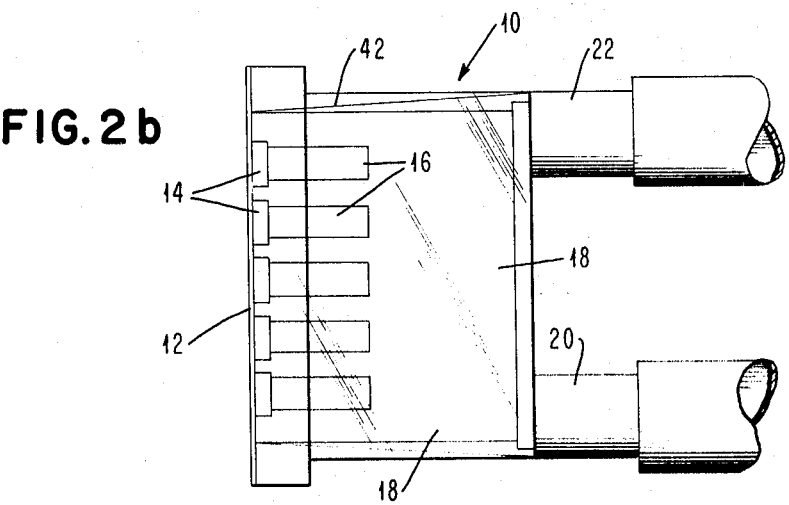
Figure 2C:
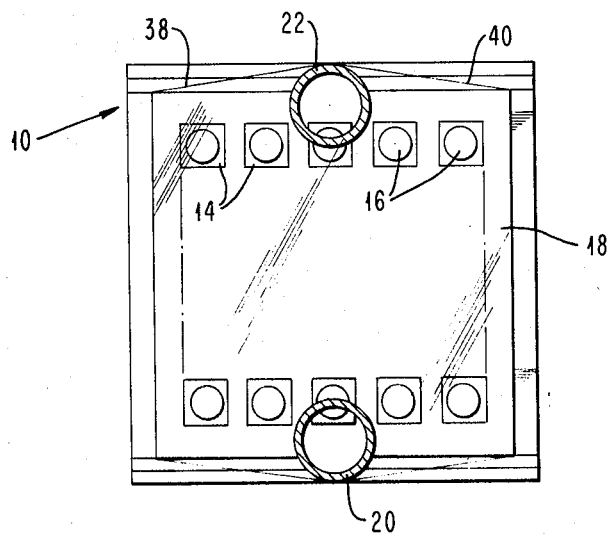

Referring to FIGS. 2a, b and c, which are the plan, side and front view, respectively, of a module 10; the top surface 36 of the chamber 18 is sloped upward toward the outlet 22 to facilitate the flow of nucleate boiling bubbles from the module chamber 18. The surface 36 not only slopes upward towards the center of the module from the sides thereof as indicated by lines 38 and 40 in FIG. 2c, but also slopes upward towards the outlet 22 at the front end of the top surface from the back surface thereof as indicated by line 42 in FIG. 2b. The upward slopes of the top surface towards the outlet 22 facilitates the flow of boiling bubbles. The hose 30 is also arranged such that it has an upward slope from the outlet 22 of the module 10 to the above located reservoir 24. Any sharp corners or obstructions which might impede the two-phase flow thus interfering with the pumping action must be avoided.

The liquid coolant reservoir 24 is a sealed unit which contains a condenser 44 in the top portion thereof. This condenser is a standard unit in which chilled water is circulated through a pipe member 46 having a number of fins 48 extending therefrom. The fins provide a chilled surface for causing condensation of vapors coming in contact therewith. It is important that the condenser 44 be located above the reservoir inlet 23 from the modules 10. The coolant liquid level is maintained below the level of inlet 23. A rotational turbulator 50 is located above the condenser which essentially consists of a motor driven fan. The blades of the fan in turning cause agitation of the vapors, etc. in the area of the condenser 44 so that noncondensables such as air are removed from the condenser surfaces. This improves the condensation capacity of the condenser by a considerable amount. A subcooler 52 is immersed within the coolant liquid 28 in the reservoir 24. The subcooler 52 consists of a finned arrangement through which chilled water is circulated to pick up the heat from the liquid 28 contained in the reservoir 24. A filter (not shown) can be located in the reservoir connected to the outlet connection 21. The filter prevents contaminants from entering the modules.

The coolant liquid 28 that is used in the system is one of the fluorocarbon liquids which have dielectric properties and a low temperature boiling point. These liquids also tend to evaporate very easily. Accordingly, a vapor proof venting valve 54 is located at the top of the reservoir 24 which provides the necessary venting of the reservoir to the ambient atmosphere and yet prevents the coolant liquid vapors from escaping. This vapor proof venting valve 54 essentially acts as a condenser to condense any of the liquid vapors contained in the escaping gas. The venting valve 54 consists essentially of a circuitous path 56 for the escaping gas, the walls of which are chilled by circulating cold water thus providing a condensing surface. The paths are sloped such that the the condensate will run out of the valve back into the liquid reservoir 24. It will be appreciated that the cooling system is an open system since it is connected to the ambient atmosphere through the venting valve 54.

The modules 10 are shown connected in parallel between the outlet and inlet hoses 26, 30 connected to the reservoir 24. It should be appreciated, that this type of parallel connection requires only one inlet and one outlet connection 23, 21 at the reservoir 24. If it is desired to expand the system, another board 12 containing further modules 10 connected in parallel between inlet and outlet hoses connected to the reservoir can be provided. Of course, the modules 10 can be connected individually to the reservoir 24 through separate connecting hoses. This would require a number of inlet and outlet connectors at the reservoir equivalent to the number of modules.

In operation, the cooling liquid reservoir 24 is located physically higher than the modules 10 so that the liquid 28 contained in the reservoir 24 will run via gravity through the outlet hose 26, filling the modules 10 connected thereto. The reservoir 24 and the liquid level in the reservoir are arranged so that the inlet hose 30 will be filled almost to the overflow point. Once the modules 10 start generating sufficient heat, nucleate boiling will take place at the components 14 and studs 16 within the modules 10. The bubbles 60 formed thereby will rise to the top of the module 10 and will pass out of the module through the hose connection 30 to the reservoir 24. The rising bubbles 60 due to their buoyancy and thermal potential set up a pumping action in the hose connector 30 between the module 10 and the reservoir 24. Thus, in the connector 30 between the modules 10 and the reservoir 24, a two-phase flow takes place. The "two-phases" are the vapor phase and the liquid forced along therewith. As this two-phase flow enters the reservoir through the inlet 23, the vapors rise to the condenser 44 where condensation takes place and the liquid drops down from the inlet 23 and adds to the liquid 28 in the reservoir 24. The condensate formed on the condenser 44 drips back into the liquid 28 within the reservoir 24. The subcooler 52 located within the liquid 28 in the reservoir 24 reduces the temperature of the cooling liquid 28 to the predetermined level. Thus, the liquid 28 which flows from the bottom outlet 21 of the reservoir 24 through the flexible hose 26 to the inputs 20 at the bottom of each of the modules 10 is maintained at a subcooled temperature; that is, some predetermined temperature below the boiling point temperature of the liquid. It should be noted that there is no circulating pump in the system. It should also be noted that as the heat flux increases, the nucleate boiling correspondingly increases which increases the pumping action that takes place to provide an increase in circulation within the cooling system and accordingly, an increase in the cooling. Since the cooling applied is self-regulatory in accordance with the amount of heat generated as noted above, it can be appreciated that the module is not limited in either size, configuration or power. Accordingly, a very flexible system is provided which is capable of maintaining modules of different power levels within their required temperature limits and which is easily serviceable without interrupting the operation of the entire system. This system has been specifically designed to provide cooling for higher power modules since low power modules would provide insufficient nucleate boiling in the subcooled fluid to generate the strong pumping action necessary to cause the circulation of the fluid.

While the invention has been particularly shown and described with reference to a preferred embodiment thereof, it will be understood by those skilled in the art that the various changes in form and detail may be made therein without departing from the spirit and scope of the invention.

What is claimed is:

1. A modular cooling system using nucleate boiling and having thermally induced two-phase flow circulation comprising:
   a plurality of modular units of heat generating electronic components;
   each of said modular units containing a chamber having a bottom inlet and a top outlet;
   a common reservoir container located above said modular units;
   a first conduit means connected from the bottom portion of the reservoir container to the inlet of each of the modular units and a second conduit means connected from the top portion of the reservoir container to each of the outlets of said modular units;
   a low temperature boiling point liquid partially filling said reservoir and completly filling said chambers in each modular unit through said first conduit means, said second conduit means is substantially filled with said low temperature boiling point liquid so that two-phase flow can take place therein;
   a condenser located above the liquid in said reservoir; and
   a cooling means immersed in the cooling liquid within said reservoir to maintain the liquid at a temperature below the boiling point; whereby nucleate boiling takes place in said liquid at said heat generating electronic components when the temperature goes above the boiling point of said liquid, the boiling bubbles rising in said chamber and passing out the top outlet causing a two-phase flow in the second conduit means thereby inducing a pumping action in the system, the boiling bubbles condensing at said condenser upon entering said reservoir container, the condensate returning to the liquid reservoir where it is further cooled by said cooling means.

2. A system according to claim 1, wherein a vapor proof venting valve is attached to said reservoir container to vent said container to the ambient atmosphere without losing the liquid contained therein by evaporation.

3. A system according to claim 1, wherein each of said chambers has a top surface which slopes upward toward said upper outlet opening to facilitate the flow of nucleate boiling bubbles.

4. A system according to claim 1, wherein said modular units are connected in parallel between an inlet and outlet connection of said container.

5. A system according to claim 1, wherein a plurality of said first conduit connection means are connected from the bottom of said reservoir container to the respective bottom connection to each of said modular units and a plurality of second conduit connection means are connected from the respective top of each modular unit to said reservoir container above the liquid level.

6. A system according to claim 1, wherein a rotational turbulator is provided adjacent said condenser so as to agitate the vapor to minimize the effects of noncondensables thereby improving the heat transfer from the vapor to the condenser.

7. A system according to claim 1, wherein said second conduit means has a predetermined diameter to allow two-phase flow therein for the predetermined range of nucleate boiling.

References Cited

UNITED STATES PATENTS

| 2,125,888 | 8/1938 | Cordrey | 62—434 |
| 2,512,545 | 6/1950 | Hazard | 62—98 |
| 2,548,325 | 4/1951 | Smith | 165—105 |
| 2,791,888 | 5/1957 | Vani | 62—434 |
| 3,143,592 | 8/1964 | August | 62—119 |
| 3,226,941 | 1/1966 | Snelling | 62—119 |
| 3,404,730 | 10/1968 | Kurisu | 165—105 |
| 3,476,175 | 11/1969 | Plevyak | 62—333 |

WILLIAM J. WYE, Primary Examiner

U.S. Cl. X.R.

62—119, 259, 332; 165—105, 138; 174—15; 317—100